Figure 1:
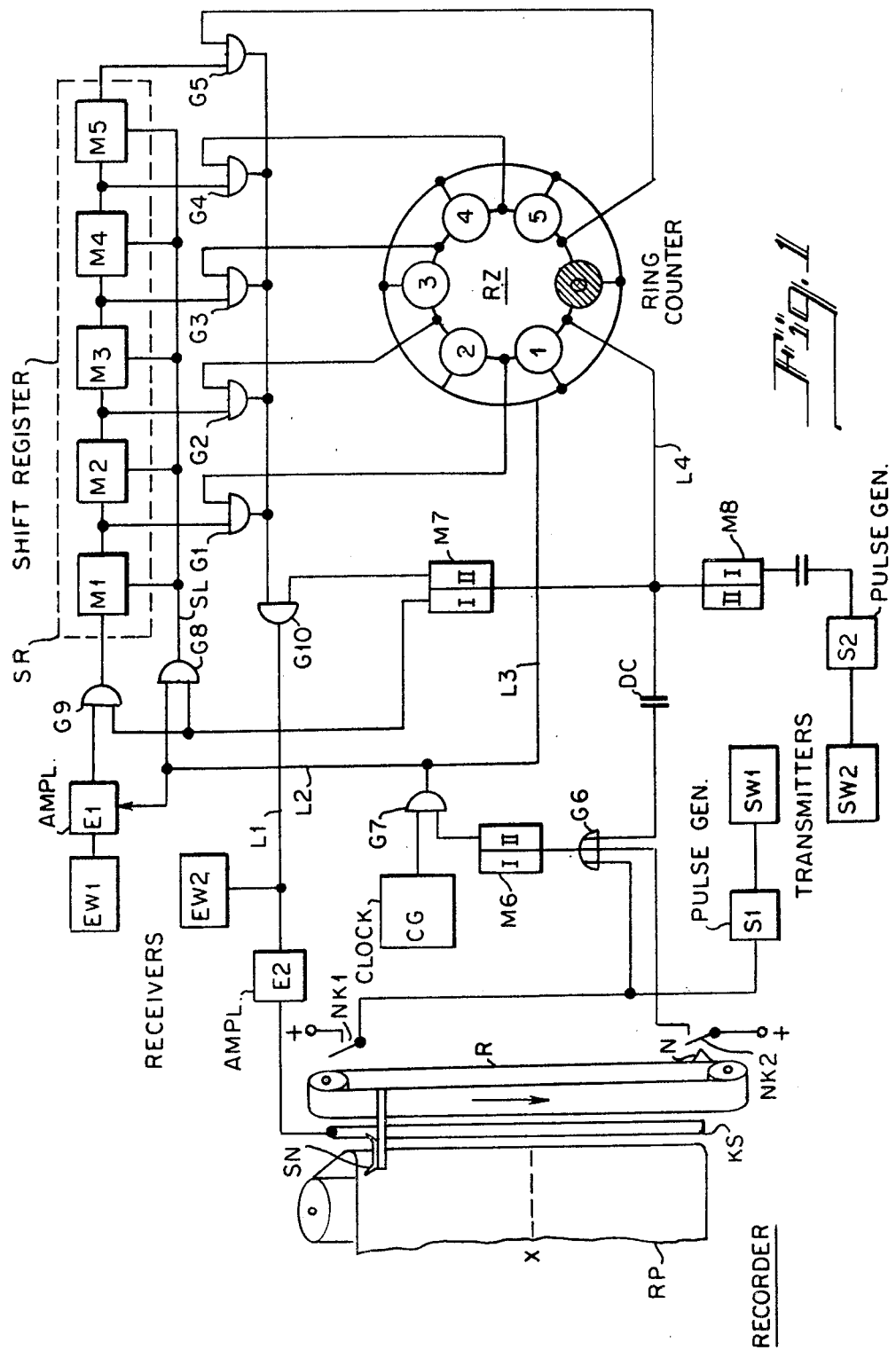

United States Patent [19]
Ahrens et al.

[11] 3,735,334
[45] May 22, 1973

[54] METHOD AND SYSTEM FOR THE POSITIONALLY CORRECT RECORDING OF TWO ECHO SIGNALS FROM RESPECTIVE ECHO SOUNDINGS TAKEN IN MUTUALLY OPPOSED SOUNDING DIRECTIONS

[75] Inventors: Erhard Ahrens; Christian Prill, both of Kiel; Hans H. Wendorff, Heikendorf, all of Germany

[73] Assignee: Electroacustic GmbH, Kiel, Germany

[22] Filed: Jan. 6, 1971

[21] Appl. No.: 104,302

[30] Foreign Application Priority Data

Jan. 7, 1970 Germany.....................P 20 00 405.1
Jan. 7, 1970 Germany.....................P 20 00 404.0

[52] U.S. Cl..................340/3 R, 340/3 T, 343/5 PC, 346/33 EC
[51] Int. Cl................................................G01s 9/70
[58] Field of Search.....................340/1 C, 1 R, 3 F, 340/3 R, 3 T; 343/5 PC; 346/33 EC

[56] References Cited

UNITED STATES PATENTS 2,958,846 11/1960 Iuskin..................................340/3 R
3,296,580 1/1967 Hopkin...............................340/3 R

*Primary Examiner*—Richard A. Farley
*Attorney*—Curt M. Avery, Arthur E. Wilfond, Herbert L. Lerner and Daniel J. Tick

[57] ABSTRACT

In echo sounding methods and systems for recording on a chart recorder the two echo signals stemming from echo soundings taken in mutually opposed sounding directions, the two echo signals are written into the chart recorder in the same writing direction. One of the two signals is intermediately stored in a memory, preferably a shift register, and is thereafter transferred in the reverse sequence from the memory into the recorder.

10 Claims, 2 Drawing Figures

METHOD AND SYSTEM FOR THE POSITIONALLY CORRECT RECORDING OF TWO ECHO SIGNALS FROM RESPECTIVE ECHO SOUNDINGS TAKEN IN MUTUALLY OPPOSED SOUNDING DIRECTIONS

Our invention relates to methods and electrical systems for the positionally correct recording of two echo signals from echo soundings taken in mutually opposed directions, so that the signals from the respective sounding directions complement each other on the recorder chart to conjointly present the desired information in a uniform manner.

It is known in purse-seine fishing to attach to the opening of the net a probe device consisting of a float equipped with sonic transducers. This probe is available, inter alia, for performing vertical soundings in the upward direction toward the sea level, followed by respective soundings in the downward direction toward the sea bottom.

It is also known to record the incoming echo signals on a writing recorder instrument, such as a chart or strip-chart recorder, the writing being such as to indicate the position as well as intensity of the echoes.

With soundings sequentially occurring in mutually opposed directions, however, a predicament is encountered if a direct recording of the echo signals is desired. That is, if the recording stylus, as is customary, passes in a uniform direction across the record carrier, such as a strip chart, then the echo signals of the one sounding direction are written in mirror-reversed sequence; on the other hand, if a positionally correct recording of the echo signals is required, then the writing stylus must alternately be moved from a midposition in the upward direction and thereafter in the downward direction, unless the recording instrument is provided with two stylus members, one for each of the two writing directions.

It is an object of our invention, therefore, to devise a method and equipment that afford two echo signals stemming from mutually opposed sounding directions, to be recorded with a single stylus or writing member in a uniform writing direction but in positionally correct relation to each other.

To this end, and in accordance with a feature of our invention, we intermediately store in the sequence of their arrival the echo signals from only one of the two sounding directions, and we then, during the recording or writing operation proper, read the intermediately stored data in the reverse sequence out of the storing memory into the recorder.

Various electrical and electronic storing or memory devices are known and available that can be readily read-out in the reverse sequence, among these are magnetic drum memories and ring-core memories. For the purpose of our invention, however, we prefer, as intermediate storage or memory device, a shift register because it combines the advantage of the more rapid accessibility of an electronic memory with the advantage of a relatively slight amount of technological equipment.

However, since the shift direction of a shift register cannot be readily reversed without considerable amount of auxiliaries, we provide, according to another feature of our invention, a ring counter for effecting the read-out of the shift register. If the shift register has a total of $n$ members, each consisting in the conventional manner of a multivibrator or flip-flop, then according to one feature of our invention the ring counter used for the read-out operation is given a total of $(n + 1)$ stages; and the read-out is effected, while the shift register is temporarily at standstill, in response to the particular state (L or O) of the $n$ individual storage members of the shift register in the consecutive sequence that corresponds to the normal shift direction.

According to a further feature of our invention, a system for performing the above-described method comprises a number of AND-gates which are correlated to the respective storage members (flip-flops) of the shift register, each AND-gate having one input connected with the output of the storage member and having the input connected with the output of one of the respective ring-counter stages. The electrical connections are such that the first storage member of the shift register, seen in the shift direction, is connected with the ring-counter stage that immediately follows the zero position, each following storage member of the shift register being connected with the next higher position of the ring counter. The outputs of all of these AND-gates are connected to a common lead (stylus control lead or writing lead) which extends to the stylus equipment of the recorder.

A disadvantage may be encountered when using as a memory or intermediate storage device a shift register with a very large number of individual storage members as is desirable or needed for the storing of echo signals. In such cases the necessity of reversing the shift direction tends to require an undesirably or uneconomically large amount of accessory equipment.

It is therefore a further object of our invention, relating to methods and systems of the type outlined above, to afford the reverse read-out of the shift register without requiring a reversal in shift direction.

This, according to another feature of our invention, is achieved by connecting, during read-out, the output with the input of the shift register thus establishing a ring-shift connection. We further key the shift register at a shift frequency $f + n[(n - 1)/t]$, wherein $n$ is the number of flip-flop members that make up the shift register and $t$ is the interval of time during which the read-out is to take place. With such a connection and shift frequency there appear cyclically at the output of the shift register a sequence of binary information; and we supply only each $(n - 1)^{th}$ information to the stylus member of the recorder.

This intermittent read-out of the memory is preferably realized by interposing an AND-gate in the connection extending from the output of the shift register to the stylus control of the chart recorder, the second input of the same AND-gate being connected to the output of an $(n - 1)$ stage ring counter which has its input connected to the keying (clock pulse) generator used for shifting the shift register during read-out operation.

Figure 2:
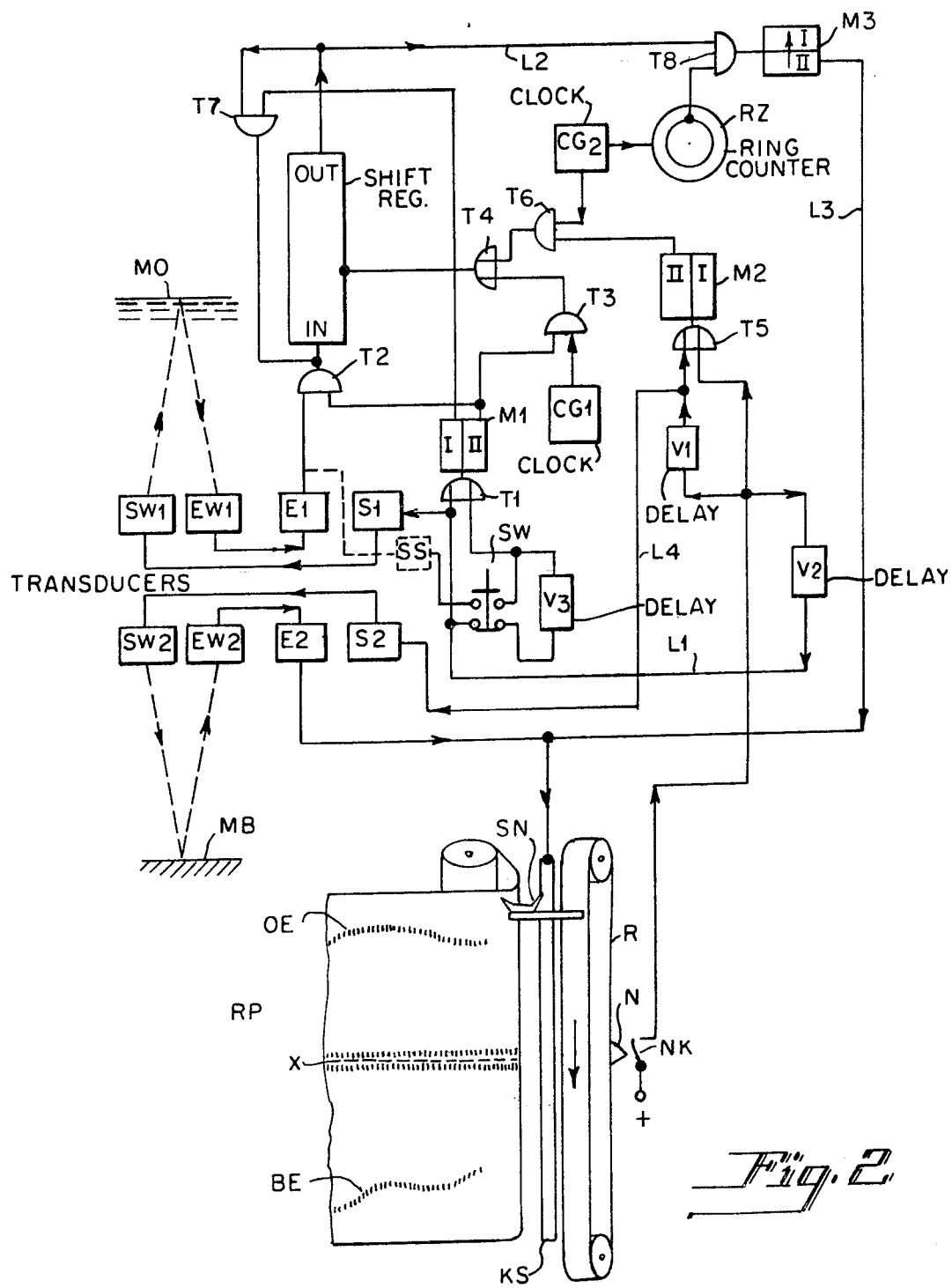

The above-mentioned and further objects, advantages and features of our invention, said features being set forth with particularity in the claims annexed hereto, will be apparent from and will be described in the following with reference to embodiments of two systems according to the invention illustrated by way of example on the accompanying drawings in which:

FIG. 1 is a schematic diagram of an echo sounding and recording system operating with a shift register as a memory and comprising a ring counter with $n + 1$ stages for effecting the read-out of the shift register; and FIG. 2 is a diagram of another echo sounding system, also equipped with a shift register as a memory, and having a ring counter with $n-1$ stages for passing each $(n-1)^{th}$ information from the ring shift register to the stylus control of the recorder.

The same reference characters are used in both illustrations for corresponding items respectively.

Referring to FIG. 1 there is illustrated an echo sounding system equipped with a conventional strip-chart recorder in which a stylus needle SN, driven by a continuously rotating, endless belt R, repeatedly passes across a current-sensitive strip-chart paper RP. The current pulses to effect the writing operation are supplied to a contact bar KS glidingly engaged by the other end of the stylus SN. During each rotation of the belt R a dog N attached to the belt closes once for a short interval of time each of two contacts NK 1 and NK 2 which produce a short current pulse. The pulse from contact NK 1 causes a pulse generator S1 to excite a sonic transmitter SW 1 which issues a sounding pulse in the upward direction toward the sea level. The same pulse from contact NK1 causes the echo signal, received from the upward sounding direction, to be entered into the memory of the system. The pulse from contact NK2 thereafter releases the read-out of the information contained in the memory. The intermediate memory consists of a shift register SR. For simplicity and lucidity of illustration, the illustrated shift register is shown to have only five storage members M1 ... M5. The actually required number of storage members in each case depends upon the measuring range and the desired resolving power. The individual storage members of the shift register consist in the conventional manner of five bistable multivibrators (flip-flops) M1 ... M5. One of the two outputs of each multivibrator is connected with the input of the next following multivibrator.

AND-gates G1, G2, ... G5 are correlated to the respective storage members M1 ... M5. One input of each gate is connected with the output of the storage member, the other input of the same gate being connected with the output of a stage which forms part of a ring-counter RC. More specifically, the first storage member M1 of the shift register, relative to the shift direction, is connected to the position 1 which follows the zero position of the ring counter RC, and each following storage member M2, M3 ... of the shift register is connected to the next higher respective positions 2, 3 and ... of the ring counter. The outputs of the AND-gates G1 ... G5 are all connected to a common output lead L1 which extends through a receiving amplifier E2 to the stylus SN and which in the following is briefly called the stylus control line.

The various operations performed during sounding activities of the system are as follows:

The illustrated equipment is so designed that the echo signals stemming from the sounding performed by the sonic transmitter SW1 and the receiver EW1 are intermediately stored in the shift register SR. Assume that these stored echo signals relate to the sounding from the above-mentioned float in the upward direction to the sea level. This sounding is released when the stylus needle SN just leaves the lower edge of the recording paper RP. At this moment, the dog N has reached the contact NK1 and has just actuated this contact to issue a pulse which reaches a pulse generator S1 and causes it to issue the sonic transmitter pulse proper. The same pulse from generator S1 passes through an OR-gate G6 to the input of a bistable multivibrator M6 which is thus triggered to flip from state I to state II, thereby unblocking an AND-gate G7. As a to the clock frequency generator CG is connected to the leads L2 and L3. On lead L2 the clock pulses reach the receiving amplifier E1 in order to thereby key the quantization of the echo; and the same clock pulses pass through the AND-gate G8 to the shift register control line SL. The AND-gates G8 and G9 in the shift control line SL ahead of the shift register SR, are kept unblocked by the bistable multivibrator M7 then in state I. Through line L3, the clock pulses reach the input of the ring counter RZ so that the ring counter rotates in synchronism with the advancing steps of the shift register SR.

When entering the echo signals into the shift register, the counter RZ only functions as a synchronous counter. Such a counter is required for obtaining a command signal which determines the end of the memory entering performance. This command is generated when the ring counter RZ, upon one full rotation, again reaches its zero position, i.e. when the output of the zero position flips to the binary value L. This value L is applied through the line L4 to the multivibrators M6, M7 and M8. The multivibrator M6 is thus triggered back to stage I. The multivibrators M7 and M8, however, now trip from state I to state II. The triggering of the multivibrator M6 back to state I has the effect of blocking the AND-gate G7 so that the clock frequency is disconnected. A differentiating capacitor DC takes care that, upon expiration the triggering pulse, no permanent voltage will remain at the input of the multivibrator M6 which voltage would render ineffective the pulses received from the dog contacts NK1 and NK2. The triggering of the multivibrator M7 to the state II causes blocking of the AND-gates G8, G9 and unblocking of the AND-gates G10 so that the outputs of the AND-gates G1 ... G5 are connected to the stylus control line L1 as is needed for the immediately subsequent read-out. The triggering of the multivibrator M8 to its state II does not have an immediate effect but takes place only to permit this multivibrator to be subsequently triggered back to the state I for then releasing the transmitter pulse from the generator S2.

As the echo signals are being entered into the shift register, the stylus SN is moved upward by the backward run of the belt R behind the recording paper RP.

The circuitry now remains in waiting condition until the styles has passed around the upper sheave of the belt R and has arrived at the upper edge of the paper RP. At this moment the dog N actuates the contact NK2. This contact, in the same manner as previously the contact NK1, acts to unblock the AND-gate G7, and the clock pulse generator CG is switched on. However, since in the meantime the AND-gates G8 and G9 have become blocked, the clock frequency voltage this time reaches only the input of the ring counter RZ. This initiates the read-out of the shift register SR. That is, while the ring counter RZ is rotating and sequentially passes through its positions 1, 2, 3, 4, 5, the corresponding AND-gates G1, G2, G3, G4, G5 are sequentially unblocked, each for a short interval of time. The unblocking in this case has the effect that the binary value L is applied to the input of the one AND-gate that at the moment is connected to the ring counter, so that the output of the same AND-gate issues a pulse in the event the value L is also present at the gate input connected with the respective coordinated storage member M1, M2 ... M5. The same effect takes place when the ring counter RZ rotates during entering of the signals into the shift register, but in this case the gate connections have no effect because the AND-gate G10 remains blocked.

Since the last stored information is located in the storage member M1 while the storage member M5 contains the first stored information, and since further the read-out takes place in the sequence M1, M2, M3, M4, M5, the memory content in this manner is read out in a sequence reverse with respect to the entering sequence. Since furthermore the last stored information is the sea-level echo and this echo signal is recorded as the first signal, the desired positionally correct recording is secured.

The recording instrument and the read-out circuitry are so set that the read-out of the memory is terminated when the writing stylus SN has reached the center line X of the recording paper RP. The marking command for the termination of the memory read-out is also produced by the fact that the ring counter RZ, upon completion of a full rotation, goes to its zero position. The pulse released thereby has the effect of triggering the multivibrators M6, M7 and M8 to the state I. This disconnects the clock frequency generator CG, the AND-gate G10 is again blocked, and the output I of the multivibrator M8 issues a pulse to the transmitting generator S2, thus releasing the sounding in the downward direction toward the sea bottom. The system thus has again attained its initial condition and remains in this condition until the writing stylus SN has arrived at the lower edge of the paper and the dog contact NK1 is again actuated to issue a pulse which initiates the next sounding cycle.

The echo sounding system shown in FIG. 2 is designed to sequentially and repetitively perform two mutually opposed soundings with the aid of transducers of which those denoted by SW1 and EW1 constitute the sonic transmitter and receiver respectively for echo sounding in the upward direction toward the sea level MO. The transmitter SW2 and receiver EW2 serve to perform the corresponding sounding in the downward direction toward the sea bottom MB. The transmitter pulses are generated by pulse generators S1 and S2. The received echo signals are amplified in receiving amplifiers E1 and E2. The echo signals received are recorded on a customary writing recorder here shown to be of the strip-chart type. As in FIG. 1, a stylus SN moved across a current-sensitive recording paper RP with the aid of an endless belt R. The paper is blackened when an electrical pulse is applied to a contact rail KS with which the other end of the stylus member SM is in continuous gliding engagement.

In the present embodiment provision is made for intermediately storing the echo signals resulting from the sounding directed upwardly toward the sea level (MO-sounding), whereas the echo signals from the sounding directed toward the sea bottom (MB-sounding) are directly written by the stylus SN onto the chart paper of the recorder. A shift register SR serves as the intermediate storage or memory device.

As the embodiment of FIG. 1 the locality from which the above-mentioned double soundings commence is coordinated to the center line X extending lengthwise of the strip chart. In this case, of course, the changes in depth position of the sounding equipment are manifested by deformations of the recorded line of the surface echo OE and by a distortion in the line of the bottom echo BE. This image defect, however, can be avoided by employing the surface-level echo as a signal for terminating the storing of the signals into the memory.

Attached to the endless belt R is a dog N which, during each full rotation of the belt, closes once a contact NK for a short interval of time. The current pulse thus issued serves directly as starting pulse for releasing the read-out of the memory content contained in the shift register SR; also derived from the same pulse by means of electric delay stages V1, V2 and V3, are the pulses for releasing the other operations, namely the termination of the read-out and the beginning of the MB-sounding operations, as well as the commencement and termination of the next following MO-sounding and the intermediate storing of the echo signals.

The time delay effected by the delay stage V1 is equal to the interval in which the stylus SN travels from the upper edge down to the center line X of the recording paper where the read-out is to stop and the MB-sounding is to commence. The time delay of the delay stage V2, however, is equal to the interval of time needed by the stylus to travel from the upper to the lower edge of the paper; and the time delay of the delay stage V3, which receives its input pulse from the output of the delay stage V2, is equal to the interval of time provided for entering the signals into the memory, since the outpput of delay stage V3 is to control the termination of the storing operation.

However, if, as briefly mentioned above, the sea-level echo is to be utilized as command for the termination of the storing operation, then a threshold stage SS is provided in lieu of the delay stage V3. In the illustrated embodiment, a selector switch SW is provided which, in the illustrated position, connects the delay stage V3 with the delay stage V2, but which, when shifted to its other position, disconnects the delay stage V3 and instead connects the threshold member SS between the output of the receiving amplifier E1 and the input of an OR-gate T1. Of course, if only one of the members V3 or SS is to be ever used in an echo sounding system, the unnecessary member may be omitted together with the selector switch SW. The threshold stage SS must be so adjusted that it will pass only echo signals of such an intensity as is to be expected from a surface (sea-level) echo, whereas the weaker fish echoes are suppressed.

The operation of the system shown in FIG. 2 will now be described in the assumption that the shift register SR comprised $n = 100$ storage members and that the sounding interval of an MO-sounding $t_2 = 1$ second.

The description of the operations commences with the moment at which the stylus SN has arrived at the lower edge of the recording paper and at which moment the MO-sounding as well as the signal storing are to be released. The release pulse, issued at this moment from the delay stage V2 simultaneously passes through the line L1 to the input of the delay stage V3, to the transmitting generator S1 and through the OR-gate T1 to the input of a bistable multivibrator M1 which up to that moment was in the state I, that is its output I exhibited the binary value L and its output II the binary value 0. This multivibrator M1 is triggered by the releasing pulse to flip to the state II. This unblocks the AND-gates T2 and T3 so that the AND-gate T2 permits the echo signals to pass from the receiving amplifier E1 to the input of the shift register SR, whereas simultaneously the AND-gate T3 connects the clock frequency generator CG1 through the OR-gate T4 to the shift line of the shift register SR. The clock frequency generator CG1 furnishes the shift keying voltage pulses during the storing operation. The frequency of the clock frequency generator CG1 must be $f_1 = n/t_1$. The sounding period $T_1$ and consequently the frequency $f_1$ depends upon the particular depth measuring range being sounded. If the equipment is designed to be switchable to different depth ranges, the clock frequency generator must also be selectively settable to corresponding frequencies. Since in the present embodiment $n = 100$ and $t_1 = 1$ sec., it follows that $f_1 = 100$ Hz.

Upon expiration of the sounding period $t_1$, the output pulse of the delay stage V3, passing likewise through the OR-gate T1, reaches the input of the multivibrator M1 and triggers it back to the state I. This again blocks the AND-gates T2 and T3. Now the input of the shift register is blocked and the clock frequency generator CG1 is cut off the shift register control line, thus terminating the storing of the echo signal.

In the meantime the belt R has moved the stylus needle SN along its backward run behind the recording paper RP back in the upward direction. However, a certain amount of time will still pass until the stylus needle SN travels beyond the upper reversing sheave of the belt R to the frontal edge of the recording paper. During this interval of time the shift register SR and consequently, the entire electronic circuitry remains idle and ready at the state reached at the end of the period $t_1$.

When the stylus arrives at the upper edge of the paper, the dog contact NK is actuated. The resulting pulse passes through the OR-gate T5 to the input of the bistable multivibrator M2 and flips the multivibrator from state I to state II. This unblocks the AND-gate T6 and connects the clock frequency generator CG2 through OR-gate T4 to the shift line of the shift register SR for read-out of the stored data.

At the termination of the signal storing operation, the multivibrator M1 returns to state I. This unblocks the AND-gate T7 and thereby connects the output of the shift register with its input. Consequently, the shift register operates in ring connection. That is, the stored information is not shifted out of the register but may rotate through the ring connection any number of times.

The output of the shift register SR is further connected by a line L2 with the input of a monostable multivibrator M3, the connection extending through an AND-gate T8 whose second input is connected to the output of a ring counter RZ. This ring counter is continuously keyed from a clock frequency generator CG2.

The clock frequency generator CG2 furnishes a register shift frequency $f_2$, which is $(n - 1)$ times higher than the frequency of generator CG1 used for entering the signals into the memory, so that the shift frequency during read-out is $f_2$=9,900 Hz. Assuming that the ring counter RZ has $(n - 1) = 99$ counts of which only one is at the binary state L, then the reverse read-out of the memory takes place as follows.

After the first 99 shifts, that is when all of the binary informations have been shifted forward a total of 99 positions, the last entered information has just traveled from the input to the output of the shift register, and at this moment the penultimately entered information is located at the input. Simultaneously, the ring counter RZ has rotated once, and its output again exhibits the binary value L. Since this L value of voltage has the effect of unblocking the AND-gate T8, the information just located at the output of the shift register SR will pass to the monostable multivibrator M3 and triggers it (in the event the information is L) to the state II. The multivibrator M issues through line L3 a writing pulse to the stylus SN. The length of this pulse, which must be equal to $t_1/n$, is determined by the corresponding dimensioning of the triggering constant of multivibrator M3.

The last entered information, normally, is the surface (sea level) echo and consequently is correctly recorded on the chart recorder as the first echo signal.

Upon further 99 shifting steps, the penultimately entered information has moved from the input to the output of the shift register. In this manner, only each $99^{th}$ information is supplied to the stylus member from the total of the binary informations which cyclically pass by the register output.

It will be understood that while the entering into the memory occurs in the signal frequency 1, 2, 3 ... 99, 100, the read-out takes place in the reverse sequence 100, 99 ... 3,2,1; and due to the $(n - 1)$ times higher shifting frequency of the register, the read-out informations follow each other with a time spacing of $t_1/n$ which correctly corresponds to the length of the period of the keying frequency $f_1 = n/t_1$.

In this manner, the positionally correct recording of the MO-sounding is secured.

When the stylus SN arrives at the line X, the delay stage V1 again issues its pulse through the OR-gate T5 to the multivibrator M2 whereby the latter flops back to the state I. This causes blocking of the AND-gate T6 and the clock frequency generator CG2 is again disconnected from the shift control line of the shift register SR. Simultaneously, the generator S2 receives a starting pulse through the line L4 in order to commence the subsequent MB-sounding. At the end of the MB-sounding, a new pulse of the delay stage V2 initiates the next following sounding.

As is known as such, the recording scale can be expanded without changing the travel speed of the stylus, by selecting for the memory read-out a clock frequency lower than the one used for entering the data into the memory. In the event such a scale expansion is desired for the recording of the MO-sounding, the frequency of the clock generator CG must be reduced in the ratio of the desired scale expansion. This does not modify the other requirements and features of the system according to the invention.

Upon a study of this disclosure, it will be apparent to those skilled in the art that our invention is amenable to various changes as to circuitry and other details, without departing from the essential features of the invention and within the scope of the claims attached hereto.

We claim:

1. The method of recording on a chart recorder the correct positions of two echo signals from pairs of respective soundings taken in mutually opposed sounding directions, which comprises recording on a sheet with a single stylus means the two echo signals of each pair of soundings in the same write-in direction; intermediately storing, in the sequence of their arrival, the echo signals from only one of the two sounding directions; and reading the intermediately stored signals in the reverse sequence out of the storage into the recorder.

2. The method of recording on a chart recorder the two echo signals from pairs of respective soundings taken in mutually opposed sounding directions, which comprises recording the two echo signals of each pair of soundings in the same write-in direction; intermediately storing, in the sequence of their arrival, the echo signals from only one of the two sounding directions; and reading the intermediately stored signals in the reverse sequence out of the storage into the recorder, and which includes intermediately storing said echo signals from one of said sounding directions in a shift register having a multiplicity ($n$) of bistate members; and reading-out the shift register in the shift direction by an ($n+1$)-stage ring counter while temporarily maintaining the shift register at standstill.

3. The method of recording on a chart recorder the two echo signals from pairs of respective soundings taken in mutually opposed sounding directions, which comprises recording the two echo signals of each pair of soundings in the same write-in direction; intermediately storing, in the sequence of their arrival, the echo signals from only one of the two sounding directions; and reading the intermediately stored signals in the reverse sequence out of the storage into the recorder, and which includes intermediately storing said echo signals from one of said sounding directions in a shift register having a multiplicity ($n$) of bistate members; connecting, during read-out, the input to the output of the shift register to form a ring-shift connection; keying the shift register with a shift frequency $f=n\ [(n-1)/t]$, wherein $n$ denotes the number of sequential shift register members and to the interval of time during which the read-out is to take place whereby a series of binary information will cyclically appear at the output of the shift register; and supplying to the chart recorder only each ($n-1$)-th information for recording.

4. A system of recording the correct positions of two echo signals from respective pairs of echo soundings taken in mutually opposed directions, comprising a chart recorder; means for recording on said recorder the two echo signals or each pair of soundings in the same record write-in direction, said means comprising separate receiver circuits for said two echo signals and a single stylus for recording both echo signals on a sheet; memory means interposed between said recorder and one of said two receiver circuits for intermediately storing in their receiving sequence the echo signals from only one of said two sounding directions; and read-out means connected between said memory and said recorder for writing into said recorder the stored signals in the reverse sequency.

5. A system of recording the two echo signals from respective pairs or echo soundings taken in mutually opposed directions, comprising a chart recorder; means for recording on said recorder the two echo signals of each pair of soundings in the same record write-in direction, said means comprising separate receiver circuits for said two echo signals; memory means interposed between said recorder and one of said two receiver circuits for intermediately storing in their receiving sequence the echo signals from only one of said two sounding directions; and read-out means connected between said memory and said recorder for writing into said recorder the stored signals in the reverse sequency, said memory means comprising a shift register having a serially connected number ($n$) of bistate storage members.

6. In a system according to claim 5, said read-out means comprising a ring counter having $n+1$ stages connected to said shift register.

7. A system of recording the two echo signals from respective pairs of echo soundings taken in mutually opposed directions, comprising a chart recorder; means for recording on said recorder the two echo signals or each pair of soundings in the same record write-in direction, said means comprising separate receiver circuits for said two echo signals; memory means interposed between said recorder and one of said two receiver circuits for intermediately storing in their receiving sequence the echo signals from only one of said two sounding directions; and read-out means connected between said memory and said recorder for writing into said recorder the stored signals in the reverse sequency, said memory means comprising a shift register having a serially connected number ($n$) of bistate storage members, said read-out means comprising a ring counter having $n+1$ stages connected to said shift register, a group of AND-gates of which each has two inputs and one output, a first one of said inputs being connected to the respective outputs of said storage members, said other inputs being connected to said respective ring counter stages with the first shift-register member relative to the shift direction connected to the first stage following the zero position of said ring counter, each next following storage member of said shift register being connected to the next higher stage of said ring counter; and said chart recorder having stylus control means connected to all of said AND-gates outputs.

8. A system according to claim 7, comprising clock-pulse means and a shirt-register control line connecting said clock-pulse means with said shift register, said ring counter having an input connected to said clock-pulse means during storage as well as during read-out; a bistable multivibrator having an input connected to the zero position stage of said ring counter; another AND-gate having two inputs and one output of which one input and said latter output connect said outputs of said group of AND-gates with said stylus control means, said multivibrator having an output connected to the other input of said other AND-gate, said other AND-gate being blocked when said shift register is filled and being unblocked during read-out of said shift register.

9. A system according to claim 5, comprising means connecting during read-out the input to the output of the shift register to form a ring shift connection; clock-pulse means connected to said shift register for shifting it at a frequency $f=n\ [(n-1)/t]$, wherein $n$ denotes the number of sequential shift register members and $t$ the interval or time during which the read-out is to take place, whereby a series of binary information will cyclically appear at the output of the shift register; said chart recorder having stylus means; and stylus control means connecting said stylus means to said shift register output for supplying to said stylus means only each ($n-1$)-th of said binary informations.

10. In a system according to claim 9, said stylus control means comprising an AND-gate having an output connected to said recorder and having two inputs of which one is connected to said shift-register output; a ring counter of $n-1$ stages having an input connected to said clock-pulse means and having an output connected to the other input of said latter AND-gate.

* * * * *